April 12, 1966 R. L. KOPERNAK 3,245,597
DESOLDERING TOOL
Filed May 13, 1963 2 Sheets-Sheet 1
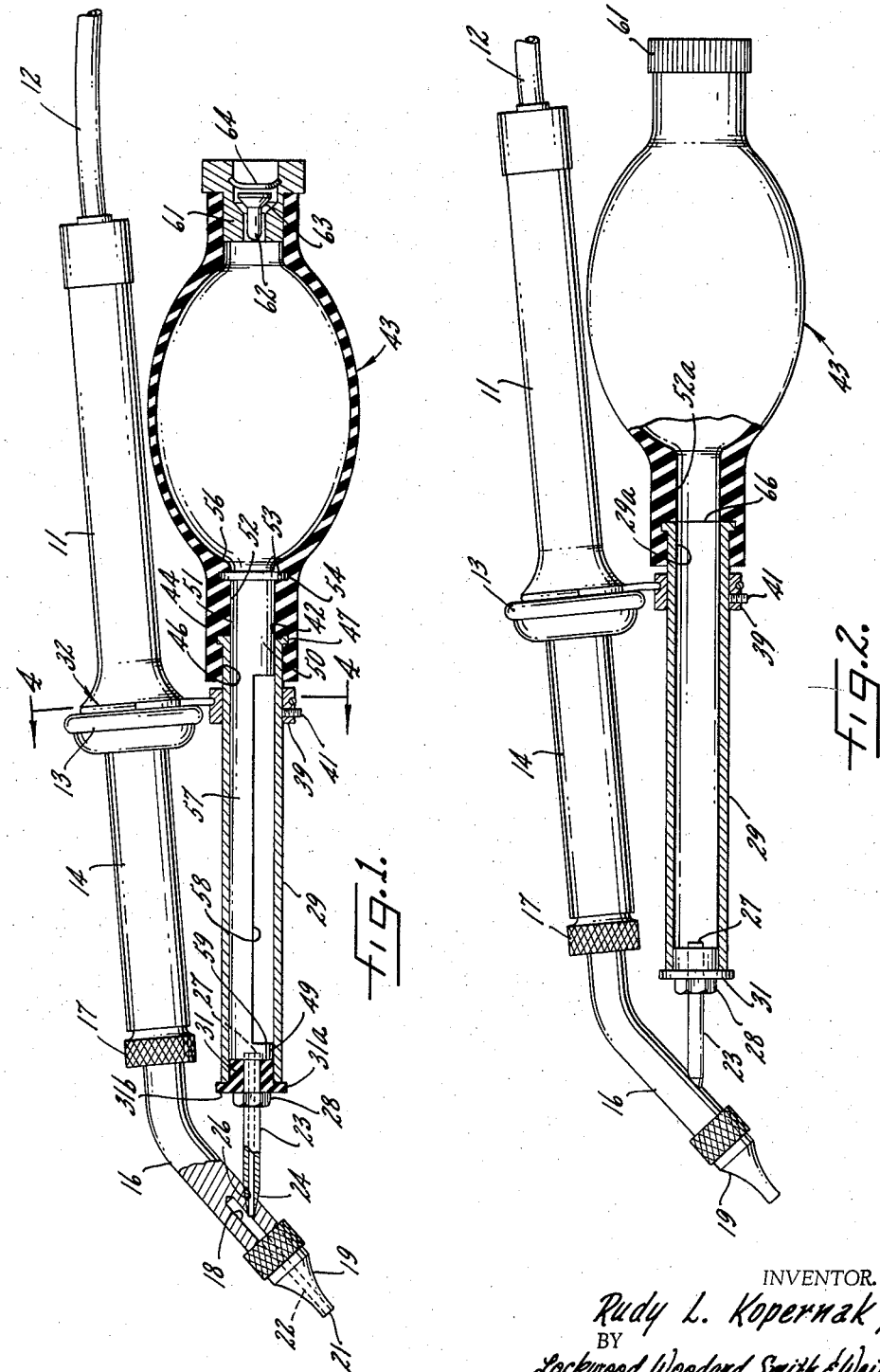
INVENTOR.
Rudy L. Kopernak,
BY
Lockwood, Woodard, Smith & Weikart
Attorneys.

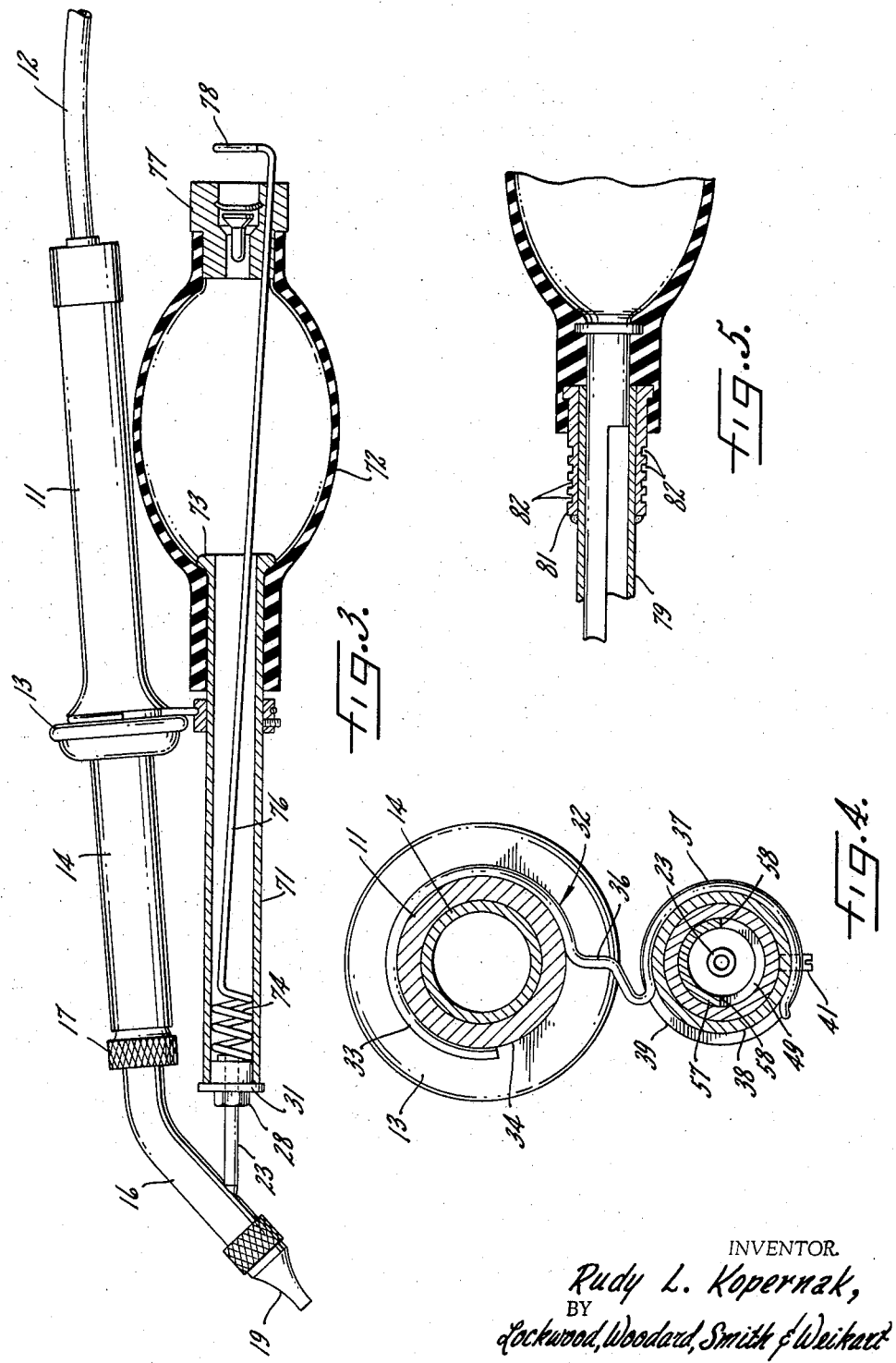

United States Patent Office 3,245,597
Patented Apr. 12, 1966

3,245,597
DESOLDERING TOOL
Rudy L. Kopernak, 6222 Park Ave., Indianapolis, Ind.
Filed May 13, 1963, Ser. No. 279,778
11 Claims. (Cl. 228—20)

This invention relates generally to soldering and desoldering tools, and more particularly to a tool having a self-contained source of vacuum and further characterized by ultimate simplicity, reliability and low cost.

Several varieties of soldering and desoldering irons and guns have been devised and patented. However, they have usually been characterized by complexity, comparatively high cost, inconvenience in use, and difficulty of maintenance. Some utilize a source of air pressure or vacuum which is separate and apart from the device or tool itself and others use self-contained sources of air pressure or vacuum. In both types, however, it has been the practice to scrupulously avoid the movement of solder into the source of vacuum. For this purpose, various types of filters, baffles, screens and other means have been used to prevent passage of solder into the source of vacuum.

Depending on the type of means employed, the required frequency of servicing the tool for removal of collected solder has varied. In some cases it appears necessary to renew the filter or empty the receiver at inconveniently frequent intervals. In some devices it is a difficult operation. In addition to these factors, the provision of such means has necessarily involved additional complexity and expense in the construction of the tool.

It is therefore a general object of the present invention to provide an improved desoldering tool.

A further object is to provide a tool of extremely low cost and high reliability.

A further object is to provide a tool which can utilize readily available conventional parts in a new combination with certain inexpensive additional parts to produce a tool achieving the foregoing objects.

A still further object is to provide a tool characterized by ultimate simplicity in maintenance and incorporating no means for preventing passage of solder into the source of vacuum.

Other objects, advantages, and features will become apparent as the description is studied in conjunction with the acompanying drawings in which:

FIG. 1 is a side elevational view of a typical embodiment of the present invention, with portions thereof being shown in vertical section to illustrate certain constructional details.

FIG. 2 is a view similar to FIG. 1 but illustrating a second and further simplified embodiment of the present invention.

FIG. 3 is a view similar to those of FIGURES 1 and 2 and illustrating a still further embodiment of the present invention.

FIG. 4 is a section taken along line 4—4 in FIG. 1 and viewed in the direction of the arrows, and enlarged.

FIG. 5 is an enlarged fragmentary vertical section illustrating a still further variation in construction.

Referring to the drawings in detail, and particularly FIGURE 1 thereof, the tool includes an elongated electrically and thermally insulated handle 11. An electrical supply cord 12, extends from the rear end of the handle. The forward end portion 13 of the handle is flared outwardly to avoid contact of the hand of the operator with the heated portion of the tool. Other handle configurations can be used within the scope of the present invention so the word handle is used generically in the claims appended hereto.

A thermally conductive housing 14 encloses an electrical heating element (not shown) which is supplied with electrical current from the supply cord 12. A heat transmitting member 16, is secured to housing 14 by means of the knurled nut 17 which is threadedly received on the housing 14. It will be recognized that the handle, heating element housing, and knurled nut portions of the tool can be quite conventional and such structures are readily available from manufacturers of standard soldering equipment.

The heat transmitting member 16 may be of circular cross-section and has a passageway 18 therein. A tip 19 having an aperture 21 in its distal end, is threadedly received on the heat transmitting member 16. The aperture in the tip communicates through the passageway 22 therein to the passageway 18 in the heat transmitting member 16.

A thermally conductive tube 23, whose forward end portion 24 is tapered, is supported in the heat transmitting member 16. The tapered portion of tube 23 is fittingly received by a tapered aperture 26 in the member 16. The tapered aperture 26, communicates with the passageway 18 in the member 16, and there is thereby provided a passageway from the tip aperture 21 to the rear end opening 27 of the tube 23. A hexagonal nut or boss 28 is affixed to the tube 23. This provision facilitates rotation of the tube 23 in the member 16 which is helpful to remove the tube 23, if and when desired for cleaning, though this operation is seldom necessary.

The solder receiver is shown in the form of an elongated tube 29 of circular cross-section. The forward end of the tube has a silicone rubber air seal 31 mounted thereto, this seal having a flange 31a abutting the forward end of the receiver tube. The front face 31b of the seal engages the rear face of the hexagonal nut 28. The seal has an aperture therein embracing the tube 23, and the rear end of the tube projects slightly rearwardly from the rear face of the seal. A portion of the seal projects into the receiver and seals against the inner cylindrical surface of the receiver.

A hanger 32, whose configuration can better be appreciated from reference to FIGURE 4, includes an upper hooked portion 33 received in a circumferential groove 34 in the handle. It has a straight portion 36 extending downwardly from the upper hooked portion and has a lower hooked portion 37 at the lower end thereof similar to the upper hooked portion 33. The lower hooked portion is received in a groove 38 in the cylindrical sleeve member 39. The inner cylindrical surface of the sleeve member 39 receives the rear portion of the solder receiver tube 29, and a set screw 41 is used to secure the receiver tube to the sleeve member. At the rear end of the receiver is an outwardly turned circular flange 42.

A flexible chamber member is provided in the form of a flexible bulb 43 usually made of rubber or other resilient material, and having an enlarged portion 44 which, in the illustrated embodiment projects forwardly from the bulb. This forwardly projecting portion of the bulb has a first inner cylindrical surface 46 embracing the exterior cylindrical surface of the solder receiver tube 29 adjacent its rear end. A groove 47 is also provided in the projection 44 and receives the tube flange 42. The bulb is thereby securely retained on the receiver in sealing engagement therewith. However the bulb is rotatable on the receiver for purposes which will become apparent.

A cleaning device is provided and, in the illustrated embodiment, is in the form of a tube with a portion of the wall cut away. This leaves a forward circular ring portion 49 disposed in the receiver 29 immediately behind the air seal 31. The rear portion 50 of the cleaning device has an outer cylindrical surface 51 embraced by a second cylindrical interior surface 52 of the bulb in the projecting portion 44. The surfaces 46 and 52 of the bulb therefore have colinear axes in the assembly. However, when the bulb is in its unstressed condition before assembly, these surfaces need not be precisely cylindrical or have colinear axes, particularly if made of a resilient material such as rubber. It also has a circular flange 53 received in the groove 54 immediately adjacent the inner wall surface 56 of the bulb. This leaves a semi-cylindrical shell portion 57 connecting the circular portion 49 to the rear portion 50, the external surface of the shell portion being immediately adjacent the inner surface of the receiver tube 29.

Because the inner surface 52 of the bulb quite snugly engages the outer surface 51 of the cleaning device, the cleaning device will be turned in the receiver 29 when the bulb is rotated on the receiver tube. This permits the edges 58 of the shell portion to scrape the inner wall of the receiver and remove any deposits such as solder or resins which may have accumulated thereon.

Because the flange 42 and the groove 47 are not as sharp and radially extensive as are the flange 54 and the groove 56 in the cleaning device, the bulb can be pulled rearwardly for removal thereof from the receiver tube, and it will simultaneously withdraw the cleaning device from its illustrated position. This action will cause the edge 59 of the cleaning device circular portion 49 to additionally provide a scraping function. It also permits complete removal of the bulb and cleaning devise whereupon any accumulated solder in the receiver or in the bulb can be discharged to a waste container. It is then a simple matter to reinsert the cleaning device in the receiver tube and move the bulb into position on the rear of the receiver to again obtain sealing engagement thereon in the position shown in the drawing.

The valve body 61 mounted in the projecting rear end of the bulb includes a valve member 62 and seat 63 and valve retainer bar 64. This device merely permits the departure of air from the bulb through the valve when the bulb is being collapsed and prevents entry of air into the bulb through the valve when the bulb is allowed to return to its original form.

In operation, the first step is for the operator to place the heated apertured tip 19 on a soldered terminal, for example, while holding the bulb in a collapsed position against the handle with his hand. When the solder has melted, the operator releases the bulb, whereupon an air flow is established from the tip into the bulb. Molten solder is thereby drawn through the passageways 22 and 18 and tube 23 into the receiver. Because the tube 23 is heated by the member 16 and insulated from the receiver, it remains hot enough to prevent solidification of the solder therein and solidification begins only in the receiver. Some solder accumulates in the receiver and particles are free to travel on into the bulb 43.

If there is an accumulation in the receiver, it is necessary only to rotate the bulb on the receiver which rotates the cleaning device to loosen the solder and permit it to pass further toward the rear of the receiver or into the bulb. It may then be removed in the manner previously described. This is only necessary after a long period of use because the entire volume of the receiver and a substantial portion of the volume of the bulb is available for accumulation of solder. Yet, because of the heating of the tube 23 by the member 16, it will always remain clear.

As an alternative means of cleaning or dumping the receiver, the screw 41 can be loosened, whereupon the solder receiver tube can be moved to the rear out of the sleeve member 39 while the tube 23 and air seal 31 may remain in position shown. On the other hand, if desired, the air seal can be removed from the tube at this time.

In the event that an accumulation of foreign matter other than solder becomes present in the tube 23, it can be removed readily by first removing the receiver in the above described manner. The tube 23 is twisted as a longitudinal force is applied to pull it from the tapered aperture in the heat transmitting member 16. The hexagonal member 28 facilitates the use of a wrench or pliers to impart this twisting action. Upon replacement of the tube 23, the air seal 31 can be reinstalled followed by reinstallation of the solder receiver tube 29.

Referring now to FIGURE 2, wherein like parts to those of FIGURE 1 are assigned identical reference numerals, the cleaning device of FIGURE 1 is omitted. In this instance, the bulb can be identical to that of FIGURE 1 but it need not be provided with the second groove 54.

In the embodiment of FIGURE 2, while the positive cleaning means has not been incorporated, it is possible to tap the receiver tube 29 to dislodge some accumulations of solder near the forward end thereof if they occur. Thereupon they are free, by the unobstructed passageway, to enter the interior of the bulb. At the junction 66 between the rear end of the receiver and the inner surface 52a of the blub, the inner surface 52a thereof and the inner surface 29a of the receiver are tangent. This permits completely unobstructed passage, back and forth between the bulb and receiver, of any solder accumulated in either, the direction of passage being dependent upon the attitude of the tool.

Referring now to FIGURE 3, wherein parts identical to those shown in FIGURE 1 are assigned the same reference characters, the solder receiver tube 71 is similar to those shown in the previous figures. However it extends entirely into the bulb 72 and its flange 73 engages the inner wall of the bulb. A cleaning device is provided having an openly coiled portion 74 disposed in the receiver near the air seal 31. An operating rod portion 76 is connected to the rear of the coil 74 and extends rearwardly through the receiver and through the bulb 72 and through the valve body 77. The valve body 77 sealingly engages the rod 76, to prevent air leakage between the rod and the valve body.

An offset portion 78 is provided at the rear end of the rod to provide handle means for moving the coiled portion back and forth in the receiver and at the same time facilitating rotation thereof in the receiver. By having the valve body 77 function as a type of bushing for the rear end portion of the rod, the rod is disposed at an angle with respect to the axis of the receiver and bulb, and this is effective to assist in the cleaning action. Typically the coiled portion 74, rod 76 and handle portion 78 are all formed from a single piece of wire.

FIGURE 5 is an enlarged fragmentary section showing an alternative to the construction shown in FIGURE 1. In this version, the solder receiver tube 79 does not have an integral flange at its rear end. Instead, a flanged sleeve member 81 is silver soldered or brazed to the outer surface, and may be snapped directly into the lower hooked portion 37 of the hanger 32. In this version, therefore, the set screw and separate sleeve member 39 are omitted. This is a somewhat less expensive construction proposed for use where the tool is furnished in a size such that production qualities are comparatively small. The four grooves 82 provide a reasonable range of adjustment of the position of the solder receiver to assure proper sealing of the receiver with the air seal 31 and tube 23. Of course the set screw and sleeve of FIGURE 1, permit unlimited adjustment in that version.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appending claims.

The invention claimed is:

1. A desoldering tool comprising:
a handle;
heating means mounted to said handle;
tip means connected to said heating means and heated thereby and having a passageway therein with an open end through which solder may be sucked from a joint to be desoldered;
a thermally conductive tube joined to said tip means and heated thereby and communicating with said passageway;
a hollow elongated solder receiver, said tube communicating with the interior of said solder receiver and supporting the front end thereof;
a wire clip having an upper portion connected to said handle and supported thereby, said clip having a lower portion;
a sleeve member connected to the lower portion of the clip and receiving said solder receiver therein, said sleeve member having adjustable fastener means thereon affixing said receiver to said sleeve member, whereby said receiver is secured in position with the front end thereof supported by said tube, said fastener means being releasable to enable removal of said receiver from the tool for cleaning;
and a source of vacuum mounted on said receiver to induce a flow of solder from said tip means, through said passageway and said tube and into said receiver.

2. A desoldering tool comprising:
a handle;
heating means mounted to said handle;
tip means connected to said heating means and heated thereby and having a passageway therein with an open end through which solder may be sucked from a joint to be desoldered;
a first generally cylindrical tube, said first tube being thermally conductive and joined to said tip means and heated thereby and communicating with said passageway, said first tube having a polygonal tool receiver boss thereon adapted to engagement by a wrench for rotating said first tube on its cylindrical axis independent of said tip means to facilitate the removal of said first tube from said tip means when desired;
an air seal of thermally-insulating heat-resistant resilient material mounted to said tube and engaging said tool receiver boss and supported by said boss and said first tube;
a second cylindrical tube larger in diameter than said first tube and having a front end portion and a rear end portion, said front end portion being received on said air seal and supported thereby, said second tube being a solder receiver and communicating with said first tube and adapted to receive solder from said first tube and thereupon cool the solder received;
a clip member formed of solid wire having a circular cross section, said clip member having an upper hooked portion received in a circumferential groove in said handle and thereby supported by said handle, and said clip member having a lower hooked portion;
a cylindrical sleeve member having a groove therein receiving said lower hooked portion whereby said sleeve member is supported by said clip member, said sleeve member receiving said solder receiver tube therethrough and said sleeve member having a set screw threadedly received therein and engaging said receiver tube near the rear end thereof whereby said receiver tube is secured in position with the front end thereof sealingly engaging said air seal, said set screw being releasable to enable adjusting the fit of said receiver tube on said air seal and to enable removal of said receiver tube from said tool for cleaning;
and a hollow flexible foldless elastic resilient rubber bulb secured directly to said receiver tube with the inner wall of said receiver tube being substantially tangent to the inner wall of said bulb at the junction of said receiver tube and the inner surface of said bulb to provide a direct and unobstructed passageway for solder to move from said receiver tube into said bulb, said cylindrical sleeve being disposed on said receiver tube between said bulb and said air seal, and said bulb being disposed adjacent said handle and external thereto whereby said bulb and said handle are simultaneously receivable in the hand of an operator to facilitate holding said tool and collapsing said bulb simultaneously in the hand and then holding said tool and allowing said bulb to expand in the hand to induce a flow into the open end of said passageway, said bulb having a valve therein remote from said receiver and oriented to permit discharge of air from said bulb through said valve and prevent inlet of air into said bulb through said valve.

3. A tool as set forth in claim 9 wherein said bulb is rotatable on said receiver, and further comprising: cleaner means having a first portion disposed in said receiver and a second portion secured to said bulb, said first portion being rotatable in said receiver upon rotation of said bulb on said receiver, whereby said first portion of said cleaner means is effective to clean the interior of said receiver upon rotation of said bulb.

4. A tool as set forth in claim 9 wherein said bulb is movable relative to said receiver, said tool further comprising: cleaner means having a first portion in said receiver and a second portion secured to said bulb, said first portion being movable in said receiver by effecting movement of said bulb relative to said receiver to clean the interior of said receiver.

5. The device of claim 9 further comprising: cleaning means movably disposed in said receiver and having an operating rod extending through said bulb to the exterior of said bulb to facilitate actuation of said cleaning means in said receiver to dislodge any foreign particles from attachment to the interior of said receiver.

6. A tool as set forth in claim 3 wherein; said receiver is an elongated tube of circular cross section, said receiver having a front end and a rear end; said bulb is sealingly and rotatably mounted to the receiver adjacent the rear end of said receiver; and the said first portion of said cleaner means includes a circular ring portion whose outer circumferential surface is adjacent the interior surface of said receiver, with an elongate semicylindrical shell connecting said ring portion to said second portion, the outer surface of said shell lying adjacent the interior surface of said receiver.

7. A tool as set forth in claim 4 wherein said receiver is elongated and has a front end and a rear end and has a cylindrical exterior surface adjacent its rear end, and said second portion of said cleaner means has a cylindrical exterior surface, and said bulb has an enlarged portion in a wall thereof with first and second internal cylindrical surfaces in said enlarged portion, said internal surfaces having colinear axes and having different diameters, said first internal cylindrical surface embracing said cylindrical exterior surface of said receiver and said second internal cylindrical surface embracing said exterior cylindrical surface of said second portion of said cleaner means.

8. A desoldering tool as set forth in claim 9 and further comprising: a bushing means mounted in a wall of said bulb opposite the portion mounted to said receiver; and a cleaning device including an openly coiled portion disposed in said receiver and engaging the interior surface of said receiver, and said cleaning device further including an operating rod connected to said coiled portion and extending rearwardly therefrom through said receiver and through said bulb and through said bushing and having a handle means thereon outside of said bulb to facilitate operation of said coiled portion in said receiver for cleaning said receiver.

9. A desoldering tool comprising: a handle; heater means mounted to said handle; a heat transmitting member mounted to said heater means; hollow tip means mounted to said heat transmitting member and having a thermally conductive tube in communication therewith and extending rearwardly therefrom; an elongated tubular solder receiver having a front end and a rear end, with the front end mounted to and thermally insulated from said tube, said receiver having outwardly extending flange means adjacent the rear end thereof; clip means mounted to said handle and having a portion receiving said receiver and accommodating longitudinal movement of said receiver in said portion, said clip means having securing means thereon to clamp said receiver in said portion when said securing means is set; and a hollow flexible bulb having a portion thereof sealed to said receiver, the interior of said bulb communicating with the hollow in said tip means through said receiver and said tube, and the hollow in said tip means having an open end through which solder may be sucked from a joint to be desoldered.

10. A device as set forth in claim 9 and further comprising: a tube disposed in said receiver and having a longitudinally extending break in the wall thereof, said tube being secured to said bulb for rotation of said tube with respect to said receiver when said bulb is rotated on said receiver to accommodate cleaning the interior surface of said receiver as said bulb is rotated.

11. A desoldering tool comprising: a handle; heating means mounted to said handle; apertured tip means associated with said heating means and heated thereby; a hollow solder receiver member coupled to said apertured tip means with the interior of said receiver communicating with an aperture in said tip means to accommodate movement of solder through said tip means and into said receiver member; a source of vacuum coupled to said receiver member; and a round wire clip member having an upper hooked portion received in a circumferential groove in said handle and thereby supported by said handle and said clip member having a lower hooked portion; a cylindrical sleeve member having a groove therein receiving said lower hooked portion, said sleeve member receiving said solder receiver member therein and having a set screw securing said receiver member thereto whereby said receiver member is secured in position coupled to said apertured tip means, said set screw being releasable to enable removable of said receiver from said tool for cleaning, the aperture in said tip means having an open end through which solder may be sucked from a joint to be desoldered.

References Cited by the Examiner

UNITED STATES PATENTS

| | | | |
|---|---|---|---|
| 559,511 | 5/1896 | Burns et al. | 219—26 |
| 571,970 | 11/1896 | Harvey | 128—401 |
| 659,470 | 10/1900 | Eggers | 128—231 |
| 944,254 | 12/1909 | Binford | 32—70 |
| 2,086,925 | 7/1937 | Schwidetzky et al. | 128—231 |
| 2,609,778 | 9/1952 | Bleam et al. | 219—26 |
| 2,955,188 | 10/1960 | Campo | 219—21 |

FOREIGN PATENTS 693,197  6/1953  Great Britain.

WHITMORE A. WILTZ, *Primary Examiner.*

ANTHONY BARTIS, CHARLES W. LANHAM,
*Examiners.*